United States Patent
Oliver et al.

(10) Patent No.: US 6,689,001 B2
(45) Date of Patent: Feb. 10, 2004

(54) ADAPTIVE BELT TENSIONER SYSTEM FOR CONTROL OF REVERSIBLE TORQUE LOAD PULLEY

(75) Inventors: Larry R. Oliver, Ozark, MO (US); Richard J. Meckstroth, Vonore, TN (US); Joseph W. Zamm, Rochester, MI (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/015,493

(22) Filed: Dec. 12, 2001

(65) Prior Publication Data

US 2003/0109342 A1 Jun. 12, 2003

(51) Int. Cl.[7] .................................................. F16H 7/08
(52) U.S. Cl. .................. 474/134; 474/109; 474/117
(58) Field of Search ................... 474/109, 111, 474/117, 133, 134, 135

(56) References Cited

U.S. PATENT DOCUMENTS

| | | | | |
|---|---|---|---|---|
| 976,115 | A | * 11/1910 | Bard | 474/134 |
| 1,848,423 | A | * 3/1932 | Jackson | 474/134 |
| 2,766,417 | A | * 10/1956 | Merritt | 318/475 |
| 3,834,477 | A | * 9/1974 | Sandow | 180/9.64 |
| 4,069,719 | A | * 1/1978 | Cancilla | 474/134 |
| 4,416,647 | A | 11/1983 | White, Jr. | |
| 4,758,208 | A | * 7/1988 | Bartos et al. | 474/135 |
| 4,768,997 | A | * 9/1988 | Page et al. | 474/84 |
| 5,131,889 | A | * 7/1992 | Meckstroth et al. | 474/117 |
| 6,167,686 | B1 | * 1/2001 | Becker et al. | 56/17.3 |
| 2002/0039944 | A1 | * 4/2002 | Ali et al. | 474/135 |
| 2002/0086751 | A1 | * 7/2002 | Bogner et al. | 474/134 |

FOREIGN PATENT DOCUMENTS

| | | | | |
|---|---|---|---|---|
| DE | 4243451 | * | 6/1994 | 474/134 |
| DE | 19926612 A1 | | 12/2000 | |
| JP | 694091 | * | 4/1994 | 474/134 |
| JP | 6159459 | * | 6/1994 | 474/111 |
| WO | WO 00/77421 A1 | | 12/2000 | |
| WO | WO 00/77422 A1 | | 12/2000 | |

* cited by examiner

Primary Examiner—Thomas R. Hannon
Assistant Examiner—Vicky A. Johnson (57) ABSTRACT

A tensioner for an endless power transmission belt, the belt being driven about a sheave. The tensioner may comprise a base, a resilient device, and first and second arms pivotally coupled for movement in an open and a closed direction. The tensioner may also comprise first and second pulleys rotatably coupled to the first and second arms, the resilient device biasing the arms in the closed direction in which the first and second pulleys apply tension to the belt. The tensioner may also comprise first and second stops positioned outside the arms on the base to limit the movement of the arms in the open direction in response to an increase in tension in the belt.

13 Claims, 5 Drawing Sheets

FIG.6

# ADAPTIVE BELT TENSIONER SYSTEM FOR CONTROL OF REVERSIBLE TORQUE LOAD PULLEY

FIELD OF EMBODIMENTS

A tensioner for an endless power transmission belt that provides both belt tensioning and dampening.

BACKGROUND

In the art of transmitting power employing an endless polymeric power transmission belt, such as driving or rotating driven sheaves or pulleys of a plurality of automobile accessories using a belt that is driven by a driving sheave connected to the automobile engine crankshaft, it is difficult to maintain such belt under a tension required to assure non-slipping engagement and driving of the driven sheaves. Numerous belt tensioners have been proposed and used heretofore in an effort to provide the required tension. This is especially true where one of the accessories being driven is the alternator or a combination alternator starter, the compressor of an air conditioning system, or a power steering device for the automobile because they, upon being driven, create a tight side and a slack side in the belt on opposite sides of their sheaves. The tight side has a varying tightness of a cyclic character as a function of the inherent cyclic change in the load imposed by the compressor or power steering device. Typically, a problem occurs because it is quite difficult to provide the required tension in the overall belt and prevent any tendency of the belt to move the tensioner temporally thereby creating belt slack elsewhere in the system.

It is known in the art to provide a tensioner for an endless power transmission belt where the belt is employed in driving a sheave comprising at least one accessory which upon being driven creates a slack side and a tight side in the belt on opposite sides of the sheave and the tensioner comprises a first and second support arm, each respectively having pivot means, first and second idler pulleys carried by the first and second support arms, respectively, and a pivot pin extending through the pivot means and pivotally supporting the arms adjacent opposite sides of the sheave with the first pulley engaging the slack side and the second pulley engaging the tight side to enable tensioning thereof and in a similar manner as disclosed in U.S. Pat. No. 4,416,647. This reference is hereby incorporated herein by reference.

It may be an aspect to provide an improved tensioner for an endless power transmission belt.

Another aspect may be to provide an improved tensioner that also provides dampening of the belt and thereby assures smooth running thereof free of vibration and/or oscillation.

SUMMARY OF EMBODIMENTS

In one manifestation there may be a tensioner for an endless power transmission belt that is driven about a sheave. The tensioner includes a base, a resilient device-that may be a spring, and first and second arms pivotally coupled for movement in an open and a closed direction. The tensioner may also comprise first and second pulleys rotatably coupled to the first and second arms, the resilient device biasing the arms in the closed direction in which the first and second pulleys apply tension to the belt. The tensioner may also comprise first and second stops positioned outside the arms on the base to limit the movement of the arms in the open direction in response to an increase in tension in the belt.

Another manifestation may be a method of assembling a tensioner for an endless power transmission belt, the belt being driven about a sheave. The method comprising the steps of providing a base, a resilient device, and first and second arms pivotally coupled for movement in an open and a closed direction. The method may also comprise the steps of providing first and second pulleys rotatably coupled to the first and second arms, the resilient device biasing the arms in the closed direction in which the first and second pulleys apply tension to the belt. The method may also comprise providing first and second stops positioned outside the arms on the base to limit the movement of the arms in the open direction in response to an increase tension in the belt.

In another embodiment during an event causing a predetermined tension on the first pulley the tensioner compensates for slack in the belt by moving the second pulley in a predetermined direction, or vice versa.

In another embodiment the tensioner may comprise bushings coupled to the arms that control travel of the arms through an interaction with the stops. The bushings may also provide a dual resistance in the tensioner with the resilient device depending on whether the arms are moving in a closed or open direction.

Another manifestation may be a method for extending a duration of use of an endless power transmission belt in an endless power transmission belt tensioning system, the belt being driven about a sheave, a tensioner in the tensioning system comprising a base, a resilient device, a pair of arms pivotally coupled for movement in an open and closed direction, a pair of pulleys rotatably coupled to the pair of arms, the resilient device biasing the arms in the closed direction in which the first and second pulleys apply tension to the belt, a pair of stops positioned outside the arms on the base to limit the movement of the arms in the open direction in response to an increase in tension in the belt. The method may comprise the steps of: detecting a predetermined condition of the belt, releasing the pair of stops from the base, moving the pair of stops so that they are coupled to the pair of arms, and fixedly coupling the pair of stops to the base.

BRIEF DESCRIPTION OF THE DRAWINGS

Further features will become apparent to those skilled in the art to which the present embodiments relate from reading the following specification and claims, with reference to the accompanying drawings, in which:

DESCRIPTION OF THE EMBODIMENT(S)

Figure 1:
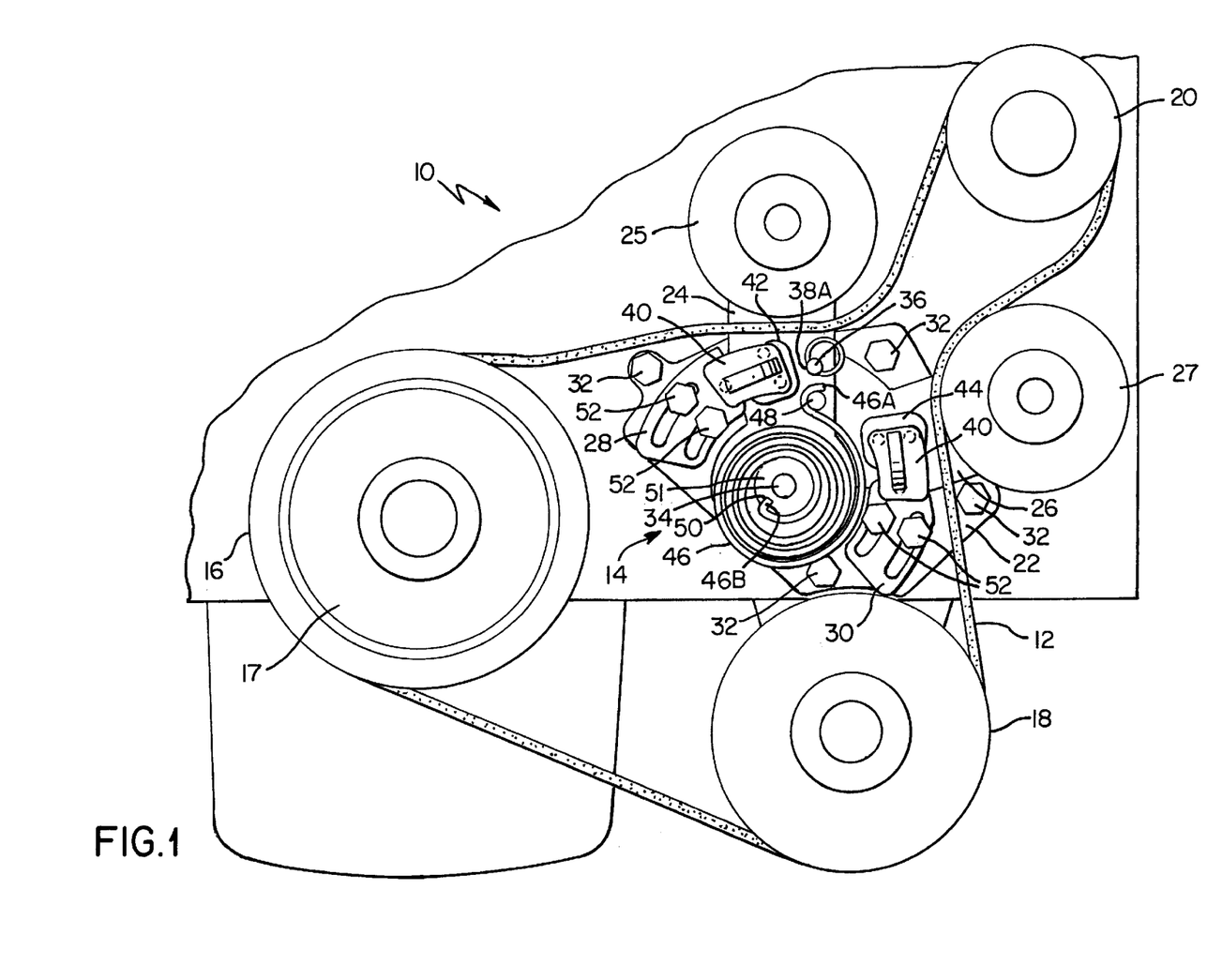
FIG. 1 is a front view of a section of an automobile engine that utilizes an embodiment of a belt tensioner that may be used to tension a belt during a first state.
Figures 2, 3:
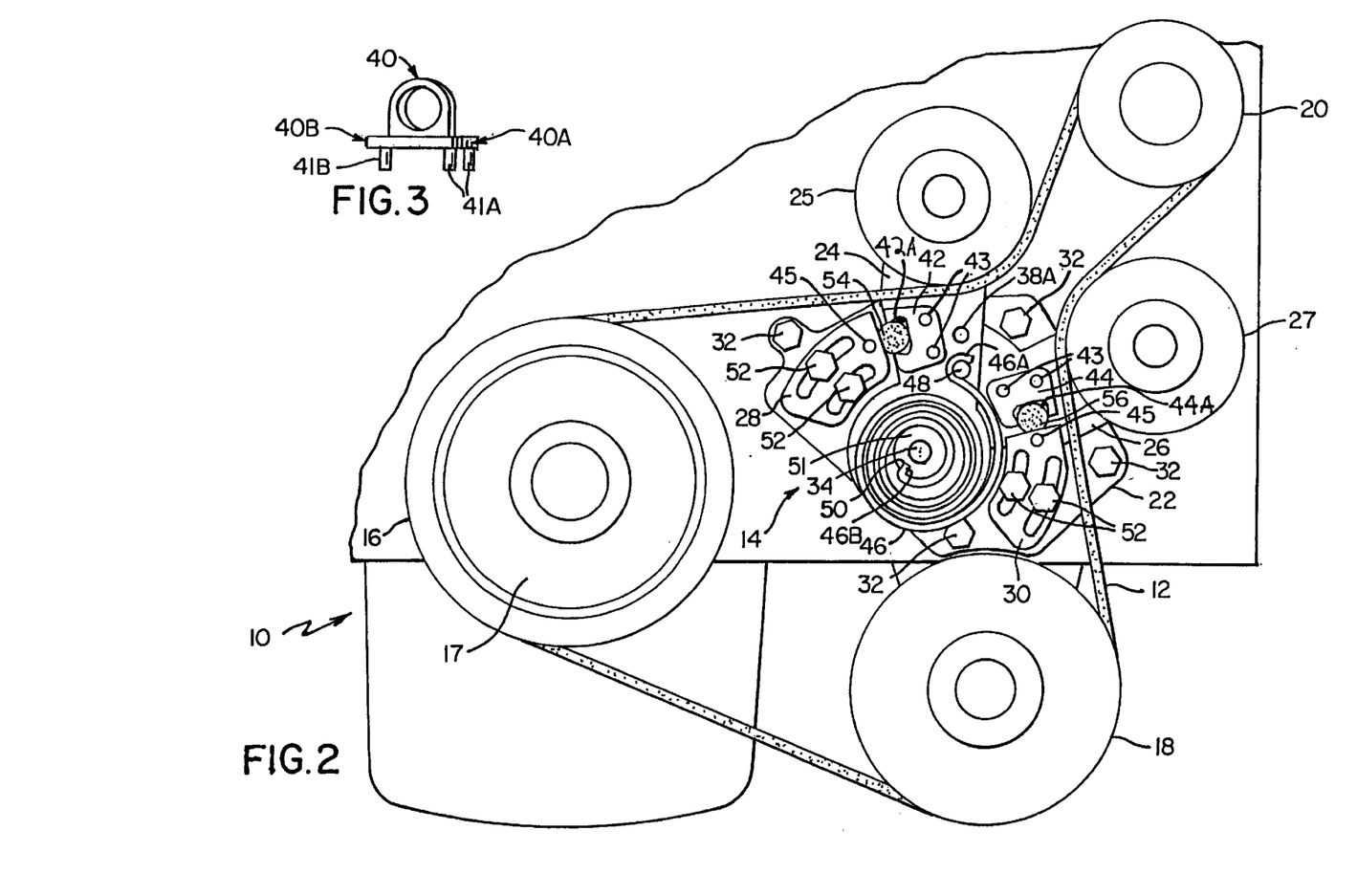
FIG. 2 is a front view of a section of an automobile engine that utilizes an embodiment of the belt tensioner that may be used to tension a belt employed in driving a plurality of sheaves during a second state.
FIG. 3 is a perspective view of a second securing device.

Reference is now made to FIGS. 1 and 2 of the drawings, which illustrates a front end of a vehicle engine, shown as an automobile engine, which may be designated generally by the reference numeral 10. This engines uses an endless power transmission belt 12 for driving a plurality of driven accessories, as will be described subsequently, and a tensioner 14 for controlling the belt 12. The tensioner 14 may be, in essence, a tensioner-dampener 14, which provides a tensioning and dampening function for the belt 12. In an embodiment, the tensioner 14 only moves toward the belt 12, i.e., the belt 12 may not be able to lift the tensioner 14.

The endless power transmission belt 12 may be of any suitable type known in the art, and may be made primarily of polymeric material. The belt 12 is driven by a driving sheave 16, where a sheave is known as a wheel or disk with a grooved or smooth rim used as a pulley. The sheave 16 operatively connects to the engine 10, and may be to a crankshaft 17 of the engine 10, as is known in the art. Through the use of the belt 12, the driving sheave 16 of this example drives a sheave 18 of a power steering device used in an automobile (not shown) employing the engine 10 and a sheave 20 of an alternator/starter device. All the driven accessories, through their sheaves, may impose a load on the belt 12.

With continuing reference to FIG. 1, the engine 10 during a first state, which is a pre-assembly state, is shown. The tensioner 14 comprises a base 22, first and second arms 24 and 26, and first and second stops 28 and 30. The arms 24 and 26 may be made of a solid metal and may be assembled to form a v-shape. The tensioner 14 further comprises first and second pulleys 25 and 27, rotatably coupled to extensions 24A and 26A (FIG. 6) on a second end of the arms 24 and 26, where the pulleys 25 and 27 interact with the belt 12 on opposite sides of the sheave 20 of the alternator/starter. The base 22 is coupled to the engine 10 via mounting devices 32, which may be threaded bolts or the like. The stops 28 and 30 are coupled to extensions 22A and 22B (FIG. 6) extending from the base 22, where the stops 28 and 30 are adjacent the arms 24 and 26.

Prior to installing the tensioner 14 within the engine 10, a securing device 36, which may be a pin, a bolt, or the like, is positioned in apertures 38A, 38B. In an embodiment a first aperture 38A is in the arm 24 and a second aperture 38B is in the arm 26. In another embodiment an additional third aperture 38C is in the base 22. The securing device 36 is inserted into the apertures 38A, 38B to hold the arms 24 and 26, stops 28 and 30, and a resilient device 46 in a predetermined or desired position for installation. This position may be so that the pulleys 25 and 27 remain at a desired distance apart to allow for easy placement of the pulleys 25 and 27 on the belt 12. Also, a first end 40A (FIG. 3) of a first linkage 40, which may have one or two pins 41A, may be positioned in apertures 43 in first and second reaction pads 42 and 44, which are coupled to the arms 24 and 26. A second end 40B (FIG. 3) of the linkages 40, which may have one or two pins 41B, is positioned in apertures 45 in the stops 28 and 30. The linkages 40 may be plastic. The reaction pads 42 and 44 may be coupled to the arms 24 and 26 via welding or the like.

The tensioner 14 further comprises a resilient device 46, which may be configured as a spring, a flat spring, or spiral flat spring. The resilient device 46 has a first end 46A coupled to an extension 48 extending from the arm 24 and a second end 46B coupled to a slot 50 in an extension 51 extending from the arm 26. In this configuration, the resilient device 46 may unwrap or unwind itself and pull the arms 24 and 26 towards each other, which may be a closed direction, where when the arms 24 and 26 move apart that may be an open direction, around pivot point 34 in a scissors like fashion to apply tension to the belt 12. In another embodiment each of the arms 24 and 26 may pivot around separate points in the open and closed directions.

Figure 6:
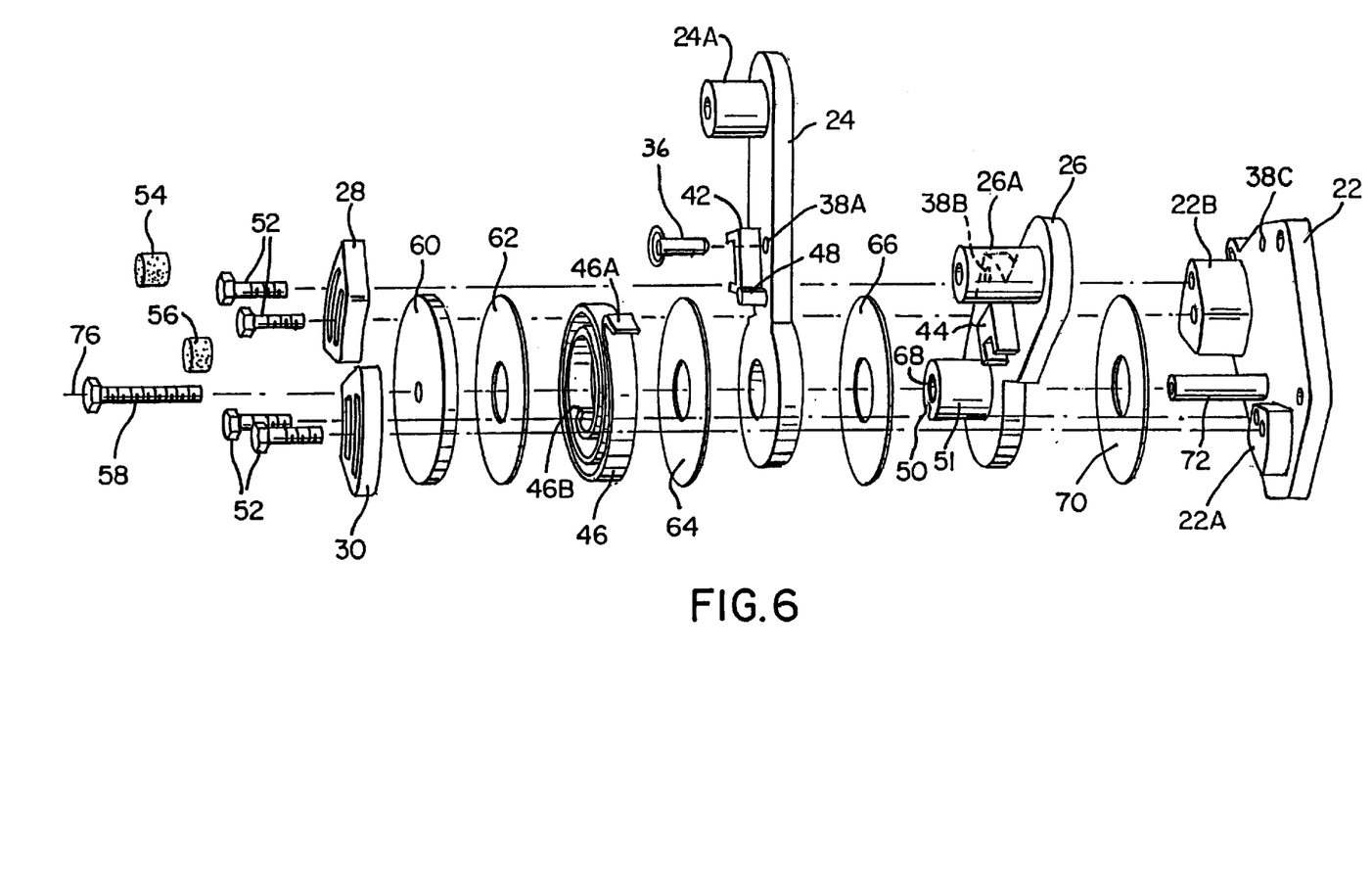
FIG. 6 is an exploded view of an embodiment of the belt tensioner.

A comparison of the position of elements within the tensioning system 14 during pre-installation is shown in FIG. 1 and during post-installation is shown in FIGS. 2 and 6. The securing device 36 holds the arms 24 and 26 apart in a position in which the belt 12 can be easily installed between the pulleys 25 and 27. Also, while the securing device 36 is in the apertures 38A, 38B it holds the resilient device 46 in a preloaded state. Once an assembler pulls the securing device 36 out of the apertures 38A, 38B, the arms 24 and 26 move towards each other under a biasing force of the spring device 46 to set a static tension of the belt 12. The tensioner 14 sets the tension automatically with the resilient device 46 after the securing device 36 is removed from the apertures 38A, 38B. The arms 24 and 26 may be positioned in a maximum load travel stop position at all times, unless the belt 12 stretches in that span. This is accomplished by the resilient device 46 automatically positioning the stops 28 and 30, based on the linkages 40 coupling the stops 28 and 30 to the arms 24 and 26, in predetermined desired positions. Once the stops 28 and 30 conclude their travel to the predetermined desired position they are fixedly mounted to the base 22 via bolts 52, which are inserted into elongated slots running through the stops 28 and 30, where the bolts 52 may be similar to the mounting devices 32. Accordingly, once the stops 28 and 30 are fixedly mounted, the linkages 40 are removed from apertures 43 and 45. After removing the linkages 40 the tensioner 14 is ready for any transient condition or event.

As best seen in FIG. 2, to assist the pulleys 25 and 27 in tensioning a slack side, the tensioner 14 further comprises first and second bushings 54 and 56 positioned adjacent the arms 24 and 26 in openings 42A and 44A of the first and second reaction pads 42 and 44. These bushings 54 and 56 have a non-linear spring rate, and may cooperate with the resilient device 46 in generating a total arm dual resistance. A first resistance is generated by the resilient device 46 as the arms 24 and 26 move between the stops 28 and 30 in response to changes in the tension in the belt 12. The resilient device 46 may control this first rate of stiffness. A second resistance is generated by the bushings 54 and 56 and the resilient device 46 after the bushings 54 and 56 contact the stops 28 and 30. Therefore, the tensioner 14 may have a first resistance while moving in a first, maybe open, direction and a second resistance while moving in a second, maybe closed, direction, which virtually eliminates any potential resonance vibration that might occur. This is caused by a transient event because resonance needs a single, continuous elastic rate, where the tensioner 14 is generating a dual resistance.

Figure 4:
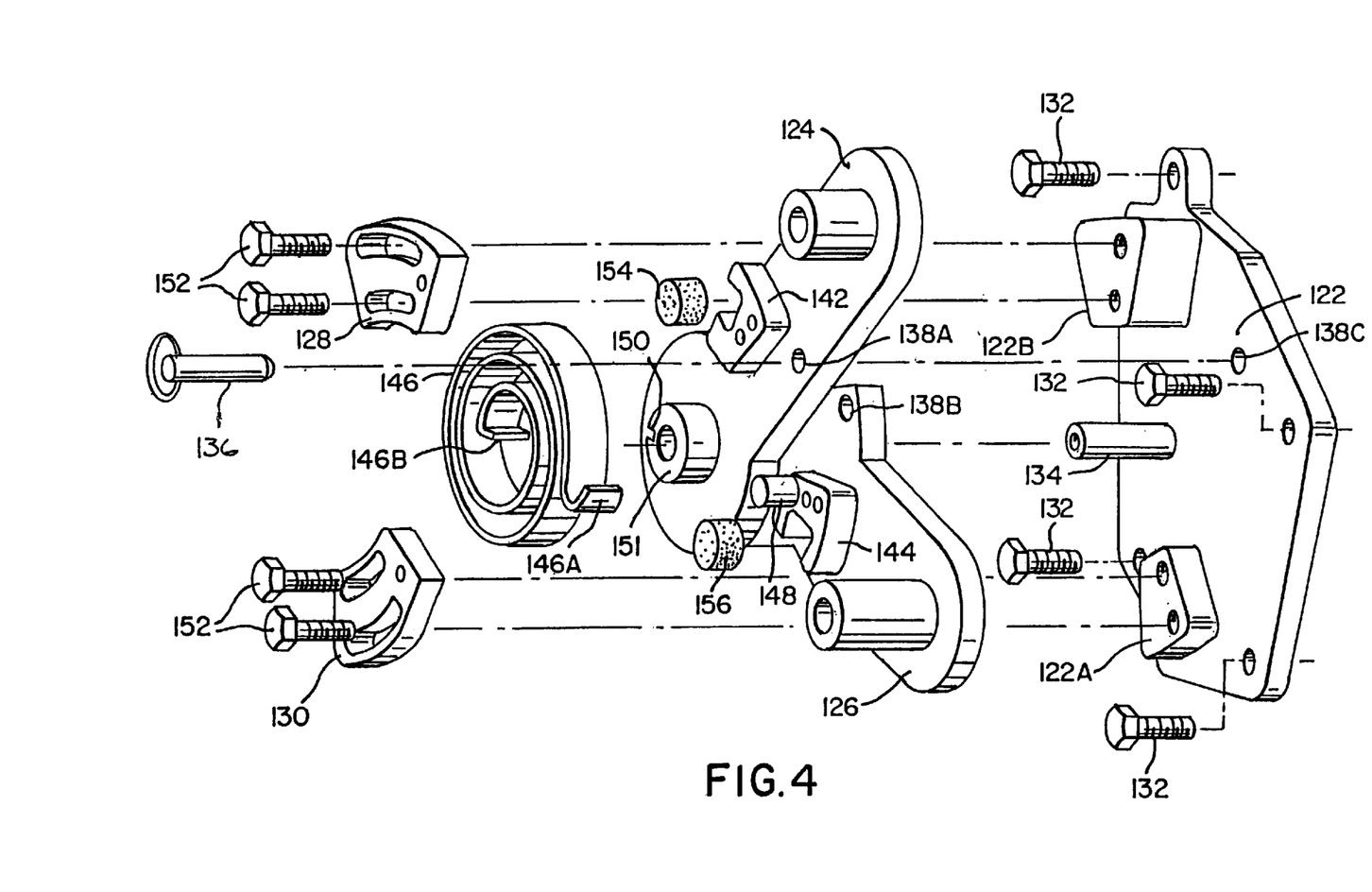
FIG. 4 is an exploded view of a tensioner according to an embodiment.
Figure 5:
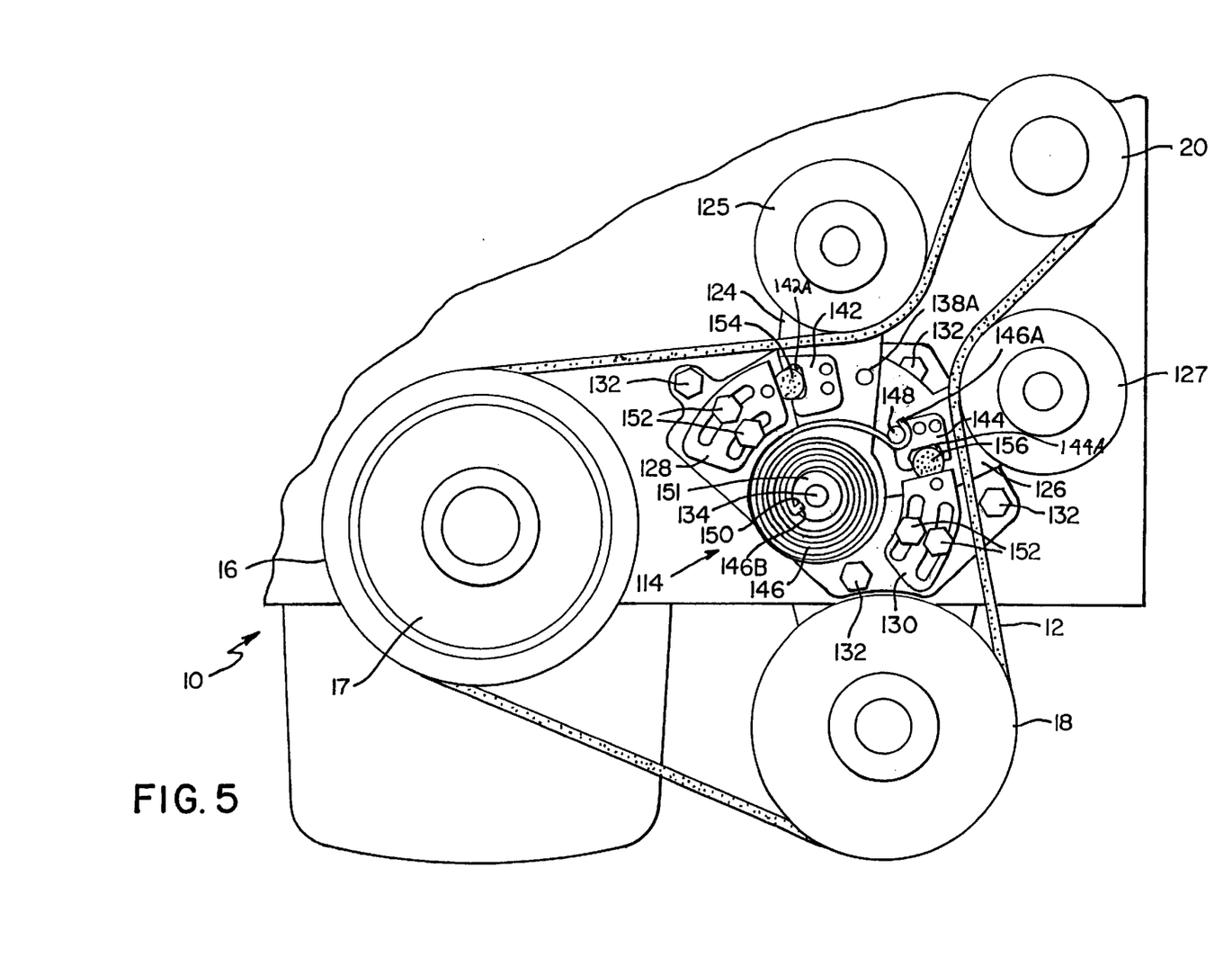
FIG. 5 is a front view of a section of an automobile engine that utilizes an embodiment of the belt tensioner that may be used to tension a belt employed in driving a plurality of sheaves during a second state.

Turning now to FIGS. 4–5, a tensioner 114 according to another embodiment is shown. All elements in the tensioner 114 that are similar to the tensioner 14 contain similar element numbers, but with a 100 designation. A difference between the tensioner 14 and the tensioner 114 is that an extension 148 extends from arm 126, where in the tensioner 14 the extension 48 may extend from the arm 24. Another difference between the tensioner 14 and the tensioner 114 is that an extension 151 with a slot 150 extends from arm 124, where in the tensioner 14 the extension 51 with the slot 50 may extend from the arm 26. The tensioner 114 functions similarly to tensioner 14 as described above and hereinafter.

It is to be appreciated that in other embodiments a tensioner apparatus utilized in an engine can comprise two tensioners each comprising their own spring, where each individual spring will bias each individual tensioner in either the open or closed direction. It is also to be appreciated that in other embodiments the pads 42 and 44 may not be utilized if the bushings 46 and 48 are coupled to the arms 24 and 26 via adhesive, a pin, or the like. Alternatively, the pads 42 and 44 may not be utilized if the linkages 40 are not utilized. Hence, in other embodiments the linkages 40 may not be utilized.

These tensioner systems 14 or 114 are designed to compensate for any transient event that occurs during operation of the vehicle. Only the tensioner 14 will be described for convenience, although the tensioner 114 performs similar functions. During steady state operation, i.e., when no transient event may be occuring, the arms 24 and 26 sit or bounce adjacent the stops 28 and 30. A first example of a transient event could be starting up of the engine. The sheave 20 of an alternator starter may be driven in a clockwise direction, which may cause the first arm and pulley 25 to lift and take on an extremely high positive load tension, which is dampened by both the resilient device 46 and the bushing 54. This lifting of arm 24 and pulley 25 tightens a section of the belt 12 adjacent the first arm 24 and pulley 25, while a section of the belt 12 adjacent the second arm 26 and pulley 27 slackens. When this occurs, the second arm 26 and pulley 27 may move toward the belt 12 to tension the slack span of the belt 12. The second arm 26 and pulley 27 may remain in that position until the transient event is over, at which time the second arm 26 and pulley 27 may return to a steady state position adjacent the stop 30.

A second example of a transient event may be when a tire of the vehicle hits a curb during a parking maneuver while a driver continues to turn a steering wheel, which may cause the power steering device and sheave 18 to take on an extremely high positive load tension. The pressure may go up to 1500 PSI, which may put about 2000 pounds of load across the suspension. This causes the sheaves 17 and 18 to take on a high load tension, which tightens a section of the belt 12 between the sheaves 17 and 18 and causes sections of the belt 12 adjacent the first arm 24 and pulley 25 and the second arm 26 and pulley 27 to slacken. When this occurs, the first arm 24 and pulley 25 and the second arm 26 and pulley 27 may move toward the belt 12 to tension the slack spans of the belt 12. The first arm 24 and pulley 25 and the second arm 26 and pulley 27 remain in those positions until the transient event is over, at which time the first arm 24 and pulley 25 and the second arm 26 and pulley 27 return to a steady state position adjacent the stops 28 and 30.

A third example of a transient event may be when a gear system shifts from first to second gear. This may cause a large reverse torque on the engine 10 in order to slow the engine down from 6000 rpm to 3000 rpm. In turn, an extremely high positive load tension may be placed on the first arm 24 and pulley 25, which is dampened by both the resilient device 46 and the bushing 54. This lift of the arm 24 and pulley 25 tightens a section of the belt 12 adjacent the first arm 24 and pulley 25 and causes a section of the belt 12 adjacent the second arm 26 and pulley 27 to slacken. When this occurs, the second arm 26 and pulley 27 may move toward the belt 12 to tension the slack span of the belt 12. The second arm 26 and pulley 27 may remain in that position until the transient event is over, at which time the second arm 26 and pulley 27 may return to a steady state position adjacent the stop 30.

With reference to FIG. 6, and again with reference to FIGS. 1–2, the tensioner 14 further comprises a system to enclose and fixedly couple the tensioner 14 to the base 22. A mounting device 58 is inserted through: an opening in a closing plate 60, an opening in a washer 62, an opening in the resilient device 46, an opening in a washer 64, an opening in arm 24, an opening in a washer 66, an opening 68 extends in the extension 51 and in the arm 26, an opening in washer 70, and finally into an opening of a hub 72 extending from the base 22. The opening in the hub 72 may comprise a threaded interior surface to fixedly receive a threaded exterior surface of the mounting device 58. All the openings may fall along line 76. Most of the tensioner 14 may be enclosed and fixedly coupled together once the mounting device 58 is received by into the hub 72. As can be appreciated, in another embodiment the tensioner 114 may be enclosed and secured with similar elements.

The slack span and the tight span of the belt 12 may vary in tightness, i.e., magnitude of tightness, in a cyclic manner and as a function of the inherent cyclic change in load imposed by the transient event. The cyclic load may have a tendency to cause the slack span of the belt 12 to vibrate and oscillate. To counteract this, the tensioners 14 and 114 may provide not only a belt tensioning function, but also a belt dampening function.

In some embodiments of the tensioners 14 and 114, the pulleys may be made from a hard plastic or spun steel, the base may be made from cast iron, steel, or die case aluminum, the bushings may be made from hard rubber with a 90 dermometer, the reaction pads may be made from cast iron or steel, the stops may be made from cast iron or steel, and the arms may be made from cast iron or steel. Also, in some embodiments of the tensioners 14 and 114, the washers may be made of plastic and the resilient device may be lined with TEFLON® tape.

Another aspect of the invention may be that the tensioner 14 is configured to extend a durational life of the belt 12. Normally, when a belt starts to stretch from wear, usually around 70,000 miles or more, the tensioner arms 24 and 26 close in the engine off condition such that they no longer rest on the stops 28 and 30. Thus, in a transient condition, the arms 24 and 26 can move from a nominal/installation position to the open position, which can result in a belt squeal. If no noises are present, routine inspection of the engine may detect that the arms 24 and 26 no longer touch the stops 28 and 30. This may occur when the resilient device 46 has pulled the arms 24 and 26 toward each other because the belt 12 has stretched too far. In either case, conventional tensioning systems required the belt be replaced. Through use of the tensioner 14, duration of the use of the belt 12 is extended after a predetermined condition of the belt 12 is detected. First, a user releases the stops 28 and 30 from the base 22 by loosening the bolts 52. Next, the user slides the stops 28 and 30 toward and against a section of the arms 24 and 26. Then, the user fixedly couples the stops 28 and 30 to the base 22 through bolts 52. By fixedly securing the stops 28 and 30 so that they again couple to the arms 24 and 26, the pulleys 25 and 27 may again touch the belt 12, which compensates for any stretch that might have formed in the belt 12. The same steps may be taken with similar elements in the tensioner 114.

The embodiments have been described in detail with respect to specific embodiments thereof, but it will be apparent that numerous variations and modifications may be possible without departing from the spirit and scope of the embodiments as defined by the following claims.

What is claimed is:

1. A tensioner for an endless power transmission belt, the belt being driven about a sheave, the tensioner comprising:

a base;

a resilient device;

first and second arms pivotally coupled for movement in an open and a closed direction;

first and second pulleys rotatably coupled to the first and second arms;

the resilient device biasing the arms in the closed direction in which the first and second pulleys apply tension to the belt;

first and second stops positioned outside the arms on the base to limit the movement of the arms in the open direction in response to an increase in tension in the belt;

a securing device;

apertures in the first and second arm for receiving the securing device;

first and second removable linkages;

a section of the first and second arms receiving a first end of the linkages; and a section of the first and second stops receiving a second end of the linkages;

wherein when the securing device is removed from the apertures, the resilient device positions the first and second arms in a desired position, sets a static tension in the belt, and the linkages position the first and second stops in a desired position at which the stops are secured to the base.

2. A tensioner for an endless power transmission belt, the belt being driven about a sheave, the tensioner comprising:

a base;

a resilient device;

first and second arms pivotally coupled for movement in an open and a closed direction;

first and second pulleys rotatably coupled to the first and second arms;

the resilient device biasing the arms in the closed direction in which the first and second pulleys apply tension to the belt;

first and second stops positioned outside the arms on the base to limit the movement of the arms in the open direction in response to an increase in tension in the belt;

a securing device; and apertures in the first and second arm for receiving the securing device;

wherein the securing device is present in the apertures while the tensioner is being mounted about the belt and the securing device is removed from the apertures thereafter.

3. A tensioner for an endless power transmission belt, the belt being driven about a sheave, the tensioner comprising:

a base;

a resilient device;

first and second arms pivotally coupled for movement in an open and a closed direction;

first and second pulleys rotatably coupled to the first and second arms;

the resilient device biasing the arms in the closed direction in which the first and second pulleys apply tension to the belt;

first and second stops positioned outside the arms on the base to limit the movement of the arms in the open direction in response to an increase in tension in the belt; and reaction pads carried on the first and second arms, the reaction pads being configured to interact with the first and second stops and to dampen the movement of the first and second arms.

4. A tensioner for an endless power transmission belt, the belt being driven about a sheave, the tensioner comprising:

a base;

a resilient device;

first and second arms pivotally coupled for movement in an open and a closed direction;

first and second pulleys rotatably coupled to the first and second arms;

the resilient device biasing the arms in the closed direction in which the first and second pulleys apply tension to the belt; and first and second stops positioned outside the arms on the base to limit the movement of the arms in the open direction in response to an increase in tension in the belt;

first and second reaction pads carried on the first and second arms;

first and second bushings; and openings in the reaction pads for receiving the bushings, the bushing being positioned in the openings of the reaction pads between the reaction pads and the first and second stops;

wherein the bushings dampen the first and second arms.

5. The tensioner of claim 4 wherein the tensioner provides a first and second resistance, wherein the first resistance is generated by the resilient device as the first and second arms move between the first and second stops in response to changes in the tension in the belt, and wherein the second resistance is generated by the bushings and the resilient device after the first and second bushings contact the first and second stops.

6. A method of assembling a tensioner for an endless power transmission belt, the belt being driven about a sheave, the method comprising the steps of:

providing a base;

providing a resilient device;

providing first and second arms pivotally coupled for movement in an open and a closed direction;

providing first and second pulleys rotatably coupled to the first and second arms;

the resilient device biasing the arms in the closed direction in which the first and second pulleys apply tension to the belt;

providing first and second stops positioned outside the arms on the base to limit the movement of the arms in the open direction in response to an increase in tension in the belt;

providing a securing device;

providing apertures the first or the second arms for receiving the securing device; and providing first and second removable linkages;

a section of the first and second arms receiving a first end of the linkages; and a section of the first and second stops receiving a second end of the linkages;

wherein when the securing device is removed from the apertures, the resilient device positions the first and second arms in a desired position, sets a static tension in the belt, and the linkages position the first and second stops in a desired position at which the stops are secured to the base.

7. A method of assembling a tensioner for an endless power transmission belt, the belt being driven about a sheave, the method comprising the steps of:

providing a base;

providing a resilient device;

providing first and second arms pivotally coupled for movement in an open and a closed direction;

providing first and second pulleys rotatably coupled to the first and second arms;

the resilient device biasing the arms in the closed direction in which the first and second pulleys apply tension to the belt;

providing first and second stops positioned outside the arms on the base to limit the movement of the arms in the open direction in response to an increase in tension in the belt;

providing first and second reactions pads carried on the first and second arms;

providing first and second bushings; and providing openings in the reactions pads for receiving the bushings, the bushings being positioned in the openings of the reaction pads between the reaction pads and the stops, wherein the bushings dampen the first and second arms.

8. The method of claim 7 further comprising the step of providing a first and second resistance with the tensioner, wherein the first resistance is generated by the resilient device as the first and second arms move between the first and second stops in response to changes in the tension in the belt, and wherein the second resistance is generated by the bushings and the resilient device after the first and second bushings contact the first and second stops.

9. A method for extending a duration of use of an endless power transmission belt in an endless power transmission belt tensioning system, the belt being driven about a sheave, a tensioner in the tensioning system comprising a base, a resilient device, a pair of arms pivotally coupled for movement in an open and closed direction, a pair of pulleys rotatably coupled to the pair of arms, the resilient device biasing the arms in the closed direction in which the first and second pulleys apply tension to the belt, a pair of stops positioned outside the arms on the base to limit the movement of the arms in the open direction in response to an increase in tension in the belt, the method comprising the steps of:

detecting a predetermined condition of the belt;

releasing the pair of stops from the base;

moving the pair of stops so that they are coupled to the pair of arms; and fixedly coupling the pair of stops to the base.

10. The method of claim 9 wherein during the detecting step an audible signal is detected.

11. The method of claim 10 wherein the audible signal is an engine noise.

12. The method of claim 9 wherein during the detecting step a visual signal is detected.

13. The method of claim 12 wherein the visual signal is that the pair of arms are not touching the pair of stops.

* * * * *